United States Patent [19]
Oki et al.

[11] Patent Number: 5,134,579
[45] Date of Patent: Jul. 28, 1992

[54] DIGITAL ADDER CIRCUIT

[75] Inventors: Mitsuharu Oki; Takao Yamazaki, both of Kanagawa, Japan

[73] Assignee: Sony Corporation, Tokyo, Japan

[21] Appl. No.: 578,139

[22] Filed: Sep. 6, 1990

[30] Foreign Application Priority Data

Sep. 5, 1989 [JP] Japan .................................. 1-229662

[51] Int. Cl.[5] .............................................. G06F 7/50
[52] U.S. Cl. .................................................. 364/786
[58] Field of Search ............... 364/784, 786, 787, 788, 364/768, 770

[56] References Cited

U.S. PATENT DOCUMENTS

| | | | |
|---|---|---|---|
| 4,660,165 | 4/1987 | Masumoto | 364/787 |
| 4,819,198 | 4/1989 | Noll et al. | 364/787 |
| 4,831,570 | 5/1989 | Abiko | 364/768 |
| 4,839,850 | 6/1989 | Noll et al. | 364/787 |
| 4,888,723 | 12/1989 | De Man et al. | 364/786 |
| 4,942,549 | 7/1990 | Jutand et al. | 364/786 |

*Primary Examiner*—Long T. Nguyen
*Attorney, Agent, or Firm*—Lewis H. Eslinger; Donald S. Dowden

[57] ABSTRACT

A digital adder circuit has a plurality of adders for adding binary numbers. A carry calculator calculates carry data to a higher bit on the basis of added results of the plurality of adders, and a carry corrector adds the carry data to the added results of the plurality of adders. An accumulator accumulates a plurality of binary numbers sequentially supplied thereto. The accumulator includes more than two adders of a plurality of bits, a delay register for delaying each of outputs and each of carry outputs of the adders by a predetermined time. The binary numbers sequentially supplied thereto and a delayed output of the delay register are sequentially added by the adders, and a carry corrector supplied with an accumulated result expressed as redundant by each of outputs of the adders corrects each of the outputs by each of the carry outputs to generate an accumulated added result having no redundancy. Thus, the digital adder circuit and the accumulator can perform calculations at high speed without substantially increasing the size of the circuit.

3 Claims, 11 Drawing Sheets

DIGITAL ADDER CIRCUIT

BACKGROUND OF THE INVENTION

1. Field of the Invention

The present invention generally relates to adding circuits and, more particularly, to an adding circuit for adding binary numbers and an accumulator for adding binary numbers sequentially supplied thereto in an accumulation fashion wherein high speed addition and accumulation can be executed without increasing the circuit scale thereof too much.

2. Description of the Prior Art

As an adding circuit for adding binary numbers $(a_{n-1}, \ldots a_1, a_0)$ and $(b_{n-1}, \ldots b_1, b_0)$ of n bits (n is an integer larger than 2) to provide binary numbers $(c_n, \ldots c_1, c_0)$ of (n+1) bits, the most popular adding circuit is formed of one half adder and (n−1) full adders.

Figure 1:
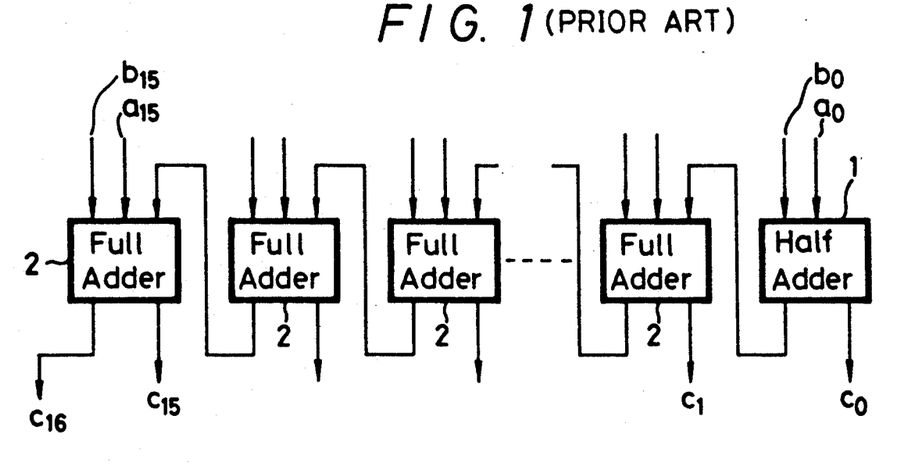
FIG. 1 is a schematic block diagram showing an example of a standard adding circuit of the prior art.

FIG. 1 shows an example of such prior-art adding circuit, wherein n=16.

As shown in FIG. 1, this adding circuit comprises a half adder 1 and full adders 2. In this popular adding circuit, carry data of the half adder of least significant bit (LSB) is gradually propagated to the full adders of most significant bit (MSB) to first provide accurate calculated results. Therefore, t assumes a calculation time of one full adder. Then, the total calculation time $T_1$ for adding binary number of n bits is expressed by the following equation (1):

$$T_1 \approx n t \qquad (1)$$

Accordingly, if n is increased too much, a lot of calculation time is required depending on the calculation purpose.

Figure 2:
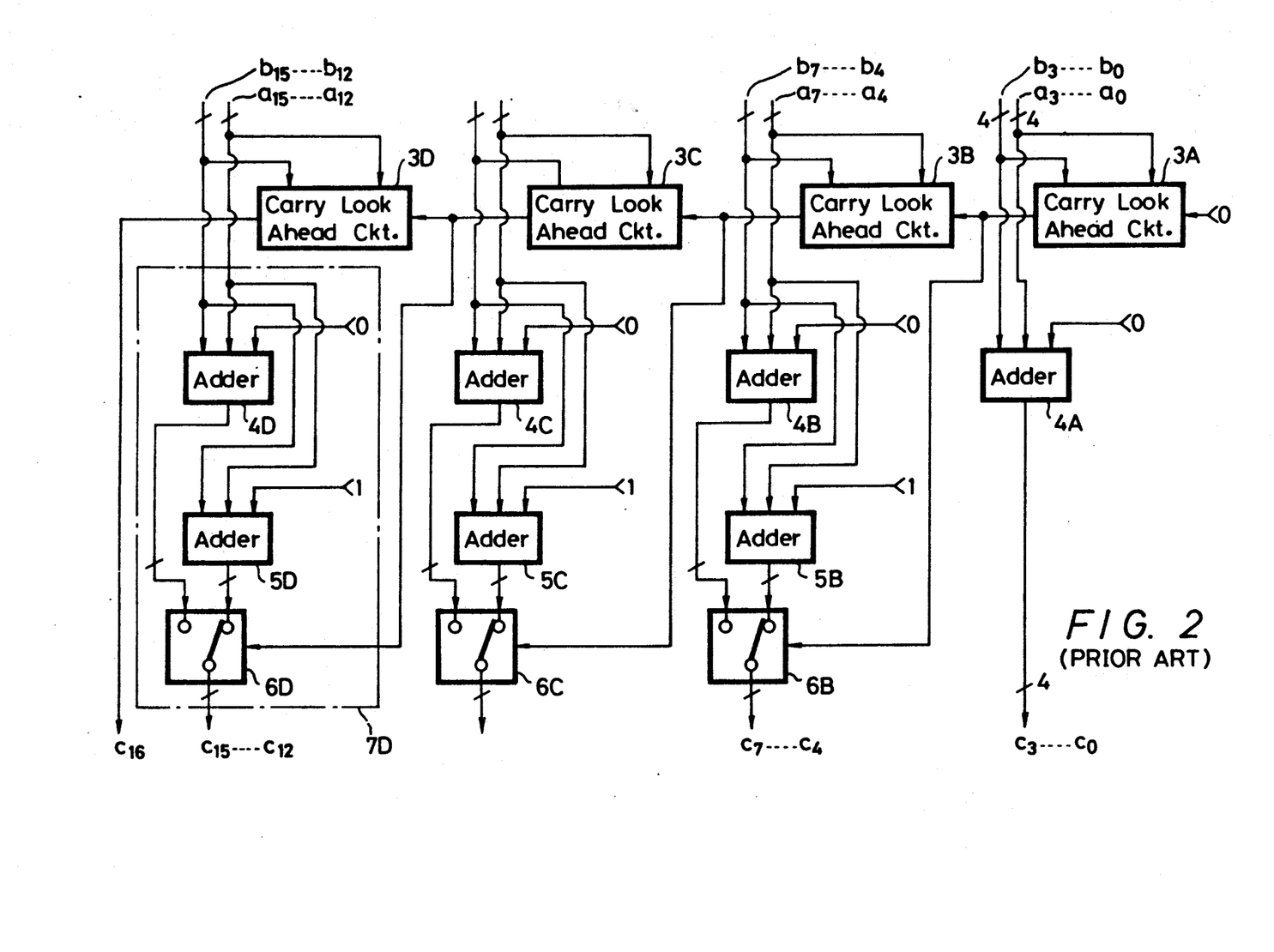
FIG. 2 is a schematic block diagram showing a prior-art adding circuit of a carry select adder system.

In order to realize the high speed addition, an adding circuit of carry select adder system is proposed. FIG. 2 shows an example of the previously-proposed carry select adder type adding circuit in which n=16, by way of example.

As shown in FIG. 2, carry look ahead circuits 3A to 3D of 4 bits are connected in cascade to calculate beforehand only carry data at high speed. Adders 4A to 4D of 4 bits are provided to perform the addition assuming that carry data from less significant bits are "0", whereas adders 5B to 5D of 4 bits are provided to perform the addition assuming that carry data from less significant bits are "1". Multiplexer circuits 6B to 6D are employed as switching circuits.

The adder 4A adds 0'th to 3rd binary numbers $(a_3 \ldots a_0$ and $b_3 \ldots b_0)$ of two binary numbers, the adder 4B adds binary numbers of 4th to 7th bits $(a_7 \ldots a_4$ and $b_7 \ldots b_4)$ assuming that carry data from less than 3 bits are "0", and the adder 5B adds binary numbers of 4th to 7th bits assuming that the carry data from less than 3 bits are "1". By selecting the added result of the adder 4B or 5B by using the multiplexer 6B in response to whether the carry data from the carry look ahead circuit 3A is "0" or "1", the added result of binary numbers of 4th to 7th bits $(c_7 \ldots c_4)$ can be obtained accurately. In the same fashion, added results $(c_{15}$ to $c_8)$ of 8th to 15th bits of the binary numbers can be obtained accurately, and a value $c_{16}$ of 16th bit can be obtained as carry data of the carry look ahead circuit 3D of the most significant bit.

Accordingly, a total calculation time required to perform the addition of binary numbers in the example of FIG. 2 becomes substantially equal to the calculation time of the 4-bit adder 4B or 5B. In the adding circuit of the carry select adder system, assuming that the calculation time of one carry look ahead circuit 3A, 3B and so on is selected to be t which is the calculation time of one 1-bit full adder and that k carry look ahead circuits, i.e., k m-bit adders are utilized, then a total calculation time $T_2$ required to add binary numbers of n (=km where m is an integer) bits is expressed as:

$$T_2 \approx kt \quad \text{(in the case of } k \geq m) \qquad (2A)$$

or $$T_2 \approx mt \quad \text{(in the case of } k < m) \qquad (2B)$$

It is to be appreciated from the foregoing equations (2A) and (2B) that, as compared with the case of the standard adding circuit (see equation (1)), this can perform the calculation at speed as high as m times to k times.

Figure 3:
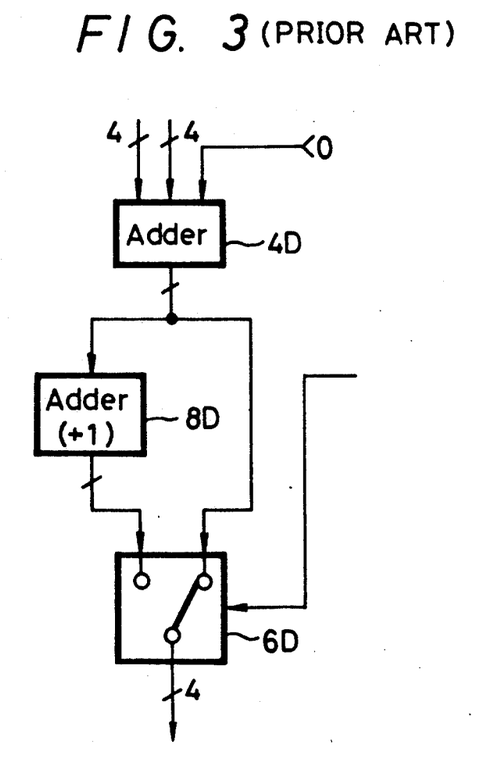
FIG. 3 is a schematic block diagram showing a modified example of the conventional carry select adder system adding circuit shown, in FIG. 2.

In the adding circuit of the carry select adder system, a circuit block 7D assumes a circuit formed of, for example, the adding circuits 4D and 5D and the multiplexer 6D. Then, an adding circuit which modifies the circuit block 7D is proposed as shown in FIG. 3. The technical report (Vol. 89, No. 4, PP. 37 to 44) of the Institute of Electronics, Informations and Communication Engineers describes this type of adding circuit.

Referring to FIG. 3, the 4-bit adding circuit 5D (see FIG. 2) for adding binary numbers is replaced with an adding circuit 8D for adding 1 to a binary number of 4 bits. This adding circuit 8D is interposed between the output port of the adder 4D and one input port of the multiplexer 6D. In that case, the calculation time at the adder 8D is added so that a total calculation time $T_3$ is expressed as:

$$T_3 \approx kt \quad \text{(in the case of } k \geq 2m) \qquad (3A)$$

or $$T_3 \approx 2mt \quad \text{(in the case of } k < 2m) \qquad (3B)$$

Although the calculation speed of the adding circuit of the carry select adder type can be increased as described above, this adding circuit needs the addition of the multiplexers 6B to 6D, which unavoidably makes the circuit scale large.

Further, if the circuit block of the example shown in FIG. 3 is employed, then the calculation speed is decreased to be substantially one half as compared with the original carry select adder type. In that case, however, the adding circuit 5D is replaced with the adding circuit 8D, which provides a reduced circuit scale. Even this circuit needs the multiplexers 6B to 6D, and there remains the substantial disadvantage that the circuit scale is very large.

Figure 4:
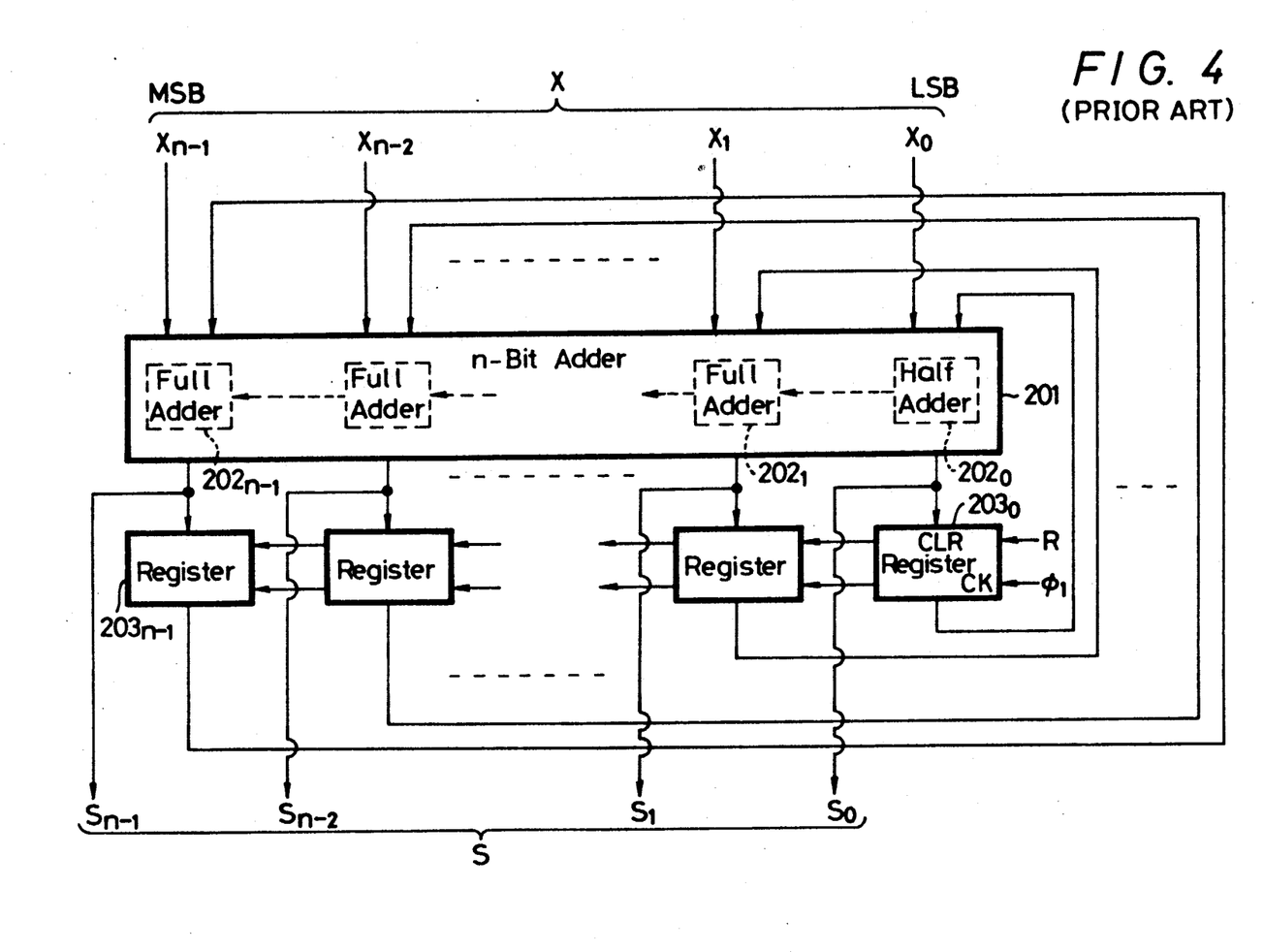
FIG. 4 is a schematic block diagram showing an example of a conventional accumulator.

FIG. 4 shows an arrangement of a prior-art accumulator which accumulatively adds (i.e., accumulates) numbers x $(x_{n-1} \ldots x_1, x_0)$ of less than n bits sequentially supplied thereto to obtain a sum s $(s_{n-1} \ldots s_1, s_0)$ of n bits.

With reference to FIG. 4, an n-bit adder 201 is constructed by connecting a single 1-bit half adder $202_0$ and (n−1) 1-bit full adders $202_1$ to $202_{n-1}$. Delay registers $203_0$ to $203_{n-1}$ are shown to have clear terminals CLR and clock terminals CK. Sum outputs of the adders $202_0$ to $202_{n-1}$ are respectively supplied to input terminals of the registers $203_0$ to $203_{n-1}$, data $x_0$ to $x_{n-1}$ of respective carries of numbers x are respectively supplied to first input terminals of the adders $202_0$ to $202_{n-1}$, and delayed outputs of the registers $203_0$ to $203_{n-1}$, are supplied to the other input terminals of the adders $202_0$ to $202_{n-1}$, respectively.

When the accumulative addition is carried out by the accumulator in the example of FIG. 4, a reset signal R is supplied to the clear terminals CLR of the registers $203_0$ to $203_{n-1}$ to reset the output data of these registers $203_0$ to $203_{n-1}$ to zero. Then, the number x supplied to the n-nit adder 201 is updated at a predetermined cycle and a clock pulse $\phi 1$ of this predetermined cycle is supplied to the clock terminals CK of the registers $203_0$ to $203_{n-1}$. Thus, the output of the n-bit adder 201 provides data $S_0$ to $S_{n-1}$ of respective carries of the sum s of n bits. In that case, the carry output from the n'th bit which is the most significant bit of the n-bit adder 201 to the $(n+1)$ bits can be neglected.

In the n-bit adder 201, however, the accurate sum output is not obtained until the carry output of the half adder $202_0$ propagates up to the full adder $202_{n-1}$. There is then the substantial disadvantage that, when the value n is increased, then the calculation speed is decreased. Assuming that T is calculation time of the one 1-bit half adder or full adder, a calculation time required by the accumulator of the example FIG. 4 to perform one calculation is expressed as nearly nT.

Japanese Patent Laid-Open Gazette No. 64-86271 describes another accumulator wherein regardless of the increase of the value n, a calculation time thereof is always substantially equal to the calculation time T of the single 1-bit full adder. This previously-proposed accumulator cannot avoid such a disadvantage that the circuit scale thereof still remains large. Further, it is frequently observed that the calculation speed is not always increased to the extent of the single 1-bit full adder.

OBJECTS AND SUMMARY OF THE INVENTION

Accordingly, it is an object of the present invention to provide an improved adding circuit whose calculation speed is higher as compared with a conventional adding circuit.

More specifically, it is an object of the present invention to provide an adding circuit which can make the calculation speed high and in which the circuit scale can be reduced as compared with a conventional carry select adder type adding circuit.

It is another object of the present invention to provide an accumulator in which an accumulative addition can be performed at a necessary calculation speed dependent on the usage without increasing the circuit scale too much.

As a first aspect of the present invention, a digital adder circuit for adding binary numbers comprises a plurality of adders for adding the binary numbers divided a predetermined bits each, a carry calculator for calculating carry data to a higher bit of the predetermined bit on the basis of added results of the plurality of adders, and a carry corrector for adding the carry data to the added results of the plurality of adders within the predetermined bits.

In accordance with a second aspect of the present invention, an accumulator for accumulating a plurality of binary numbers sequentially supplied thereto comprises more than two adders of a plurality of bits, a delay register for delaying each of outputs and each of carry outputs of the more than two adders of the plurality of bits by a predetermined time, the binary numbers sequentially supplied thereto and a delayed output of the delay register being sequentially added by the more than two adders of the plurality of bits, and a carry corrector supplied with an accumulated result expressed as redundant by each of outputs of the more than two adders of the plurality of bits and carry outputs and for correcting each of the outputs by each of the carry outputs to generate an accumulated added result having no redundancy.

The preceding, and other objects, features and advantages of the present invention will be apparent in the following detailed description of preferred embodiments when read in conjunction with the accompanying drawings, in which like reference numerals are used to identify the same or similar parts in the several views.

DETAILED DESCRIPTION OF PREFERRED EMBODIMENTS

An embodiment of an adding circuit according to the present invention will be described with reference to FIGS. 5 to 8. In this embodiment, the present invention is applied to an adding circuit which obtains a binary number ($c_{16}, c_{15}, \ldots c_0$) of 17 bits by adding two binary numbers ($a_{16} \ldots a_0$) and ($b_{15} \ldots b_0$) of 16 bits.

Figure 5:
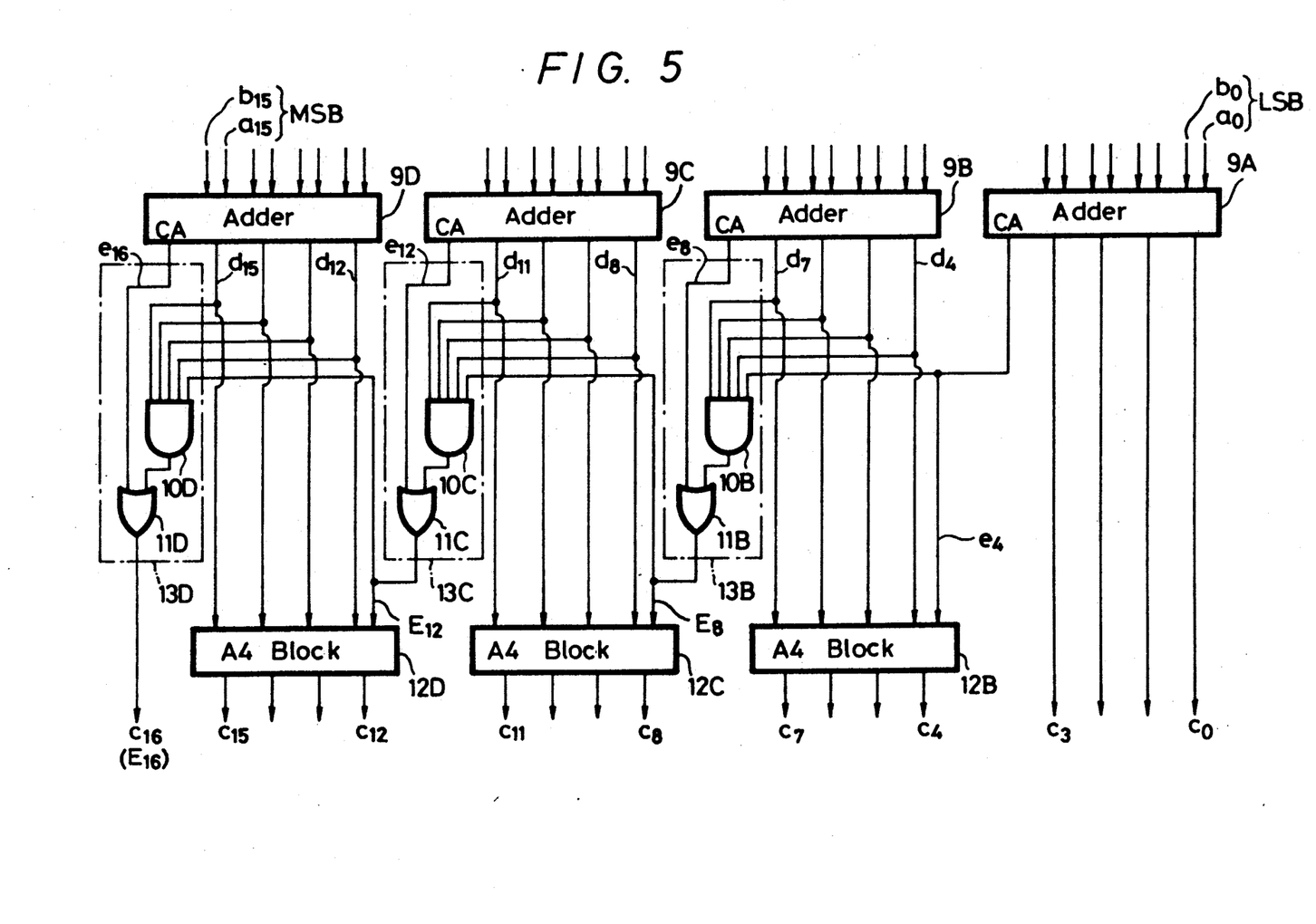
FIG. 5 is a block diagram showing a first embodiment of an adding circuit according to the present invention.

FIG. 5 is a block diagram which shows the embodiment of the adding circuit according to the present invention.

With reference to FIG. 5, 4-bit adders 9A to 9D are provided to add two binary numbers of 4 bits. The binary numbers of 16 bits are divided to provide binary numbers of 4 bits each and binary numbers ($a_3 \ldots a_0$) and ($b_3 \ldots b_0$) of least significant 4 bits are added by the adder 9A. The binary numbers ($a_7 \ldots a_4$) and ($b_7 \ldots b_4$) of the next 4 bits are added by the adder 9B. The binary numbers ($a_{11} \ldots a_8$) and ($b_{11} \ldots b_8$) of the next 4 bits are added by the adder 9C. Finally, binary numbers ($a_{15} \ldots a_{12}$) and ($b_{15} \ldots b_{12}$) of the most significant 4 bits are added by the adder 9D. The added outputs of 4 bits excepting the carry data of the adder 9A is provided as the least significant 4 bits ($c_3 \ldots c_0$) of the finally obtained added result, while carry data $e_4$, $e_8$, $e_{12}$, $e_{16}$ are generated from carry output terminals CA of the adders 9A to 9D, respectively.

The carry data $e_4$ of the adder 9A and the added results ($d_7 \ldots d_4$) of 4 bits from the adder 9B are supplied to input terminals of 5-input AND circuit 10B, and output data of this AND circuit 10B and the carry data $e_8$ of the adder 9B are supplied to input terminals of an OR circuit 11B. Accurate carry data $E_8$ to the 8th bit (which will be described later), which is the output data of the OR circuit 11B, and added results ($d_{11} \ldots d_8$) of 4 bits from the adder 9C are supplied to input terminals of a 5-input AND circuit 10C. Output data of this AND circuit 10C and carry data $e_{12}$ of the adder 9C are supplied to an OR circuit 11C. Accurate carry data $E_{12}$ to the 12th bit, which is the output data from the OR circuit 11C, and added results ($d_{15} \ldots d_{12}$) of 4 bits from the adder 9D are supplied to input terminals of a 5-input AND circuit 10D, and output data from the AND circuit 10D and carry data $e_{16}$ of the adder 9D are supplied to input terminals of OR circuit 11D. Output data $E_{16}$ of this OR circuit 11D is provided as 16th bit value $c_{16}$ of the final added result. Therefore, the circuit groups (10B, 11B), (10C, 11C) and (10D, 11D) can be regarded as carry computers (or calculators) 13B, 13C and 13D, respectively.

As illustrated in FIG. 5, adders 12B to 12D are provided to add binary numbers of 1 bit to binary numbers of 4 bits to obtain binary numbers of 4 bits. These adders 12B to 12D are referred hereinafter as "A4 blocks" in the following description. These A4 blocks 12B to 12D do not calculate carry data for 4th bit. The A4 block 12B adds the carry data $e_4$ to the added results ($d_7 \ldots d_4$) of the adder 9B, the A4 block 12C adds the accurate carry data $E_8$ to the added results ($d_{11}$ to $d_8$), and the A4 block 12D adds the accurate carry data $E_{12}$ to the added results ($d_{15} \ldots d_{12}$) of the adder 9D. The added results of 12 bits of these A4 blocks 12B to 12D are obtained as 12-bit values ($c_{15} \ldots c_4$) of the finally added results.

Figure 6:
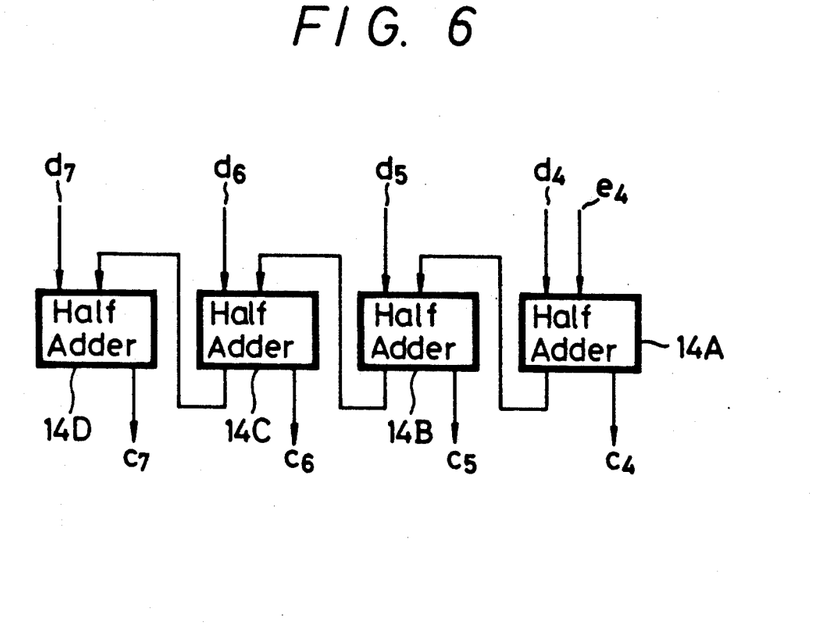
FIG. 6 is a schematic block diagram showing a main portion of the adding circuit of FIG. 5.

FIG. 6 shows an example of the A4 block 12B (see FIG. 5).

Referring to FIG. 6, half adders 14A to 14D are provided, wherein an intermediate added result $d_4$ and carry data $e_4$ are supplied to different input terminals of the half adder 14A, respectively, intermediate added results $d_5$ to $d_7$ are supplied to first input terminals of the half adders 14B to 14D, respectively, and carry data from the half adders 14A, 14B and 14C are supplied to the other input terminals of the half adders 14B, 14C and 14D, respectively. The added results of these half adders 14A to 14D are obtained as final added results ($c_7 \ldots c_4$). In that case, assuming that a calculation time of one half adder is represented by t, a total calculation time required by the A4 block 12B in the example of FIG. 6 to obtain an accurate value is substantially 4t.

Figure 7:
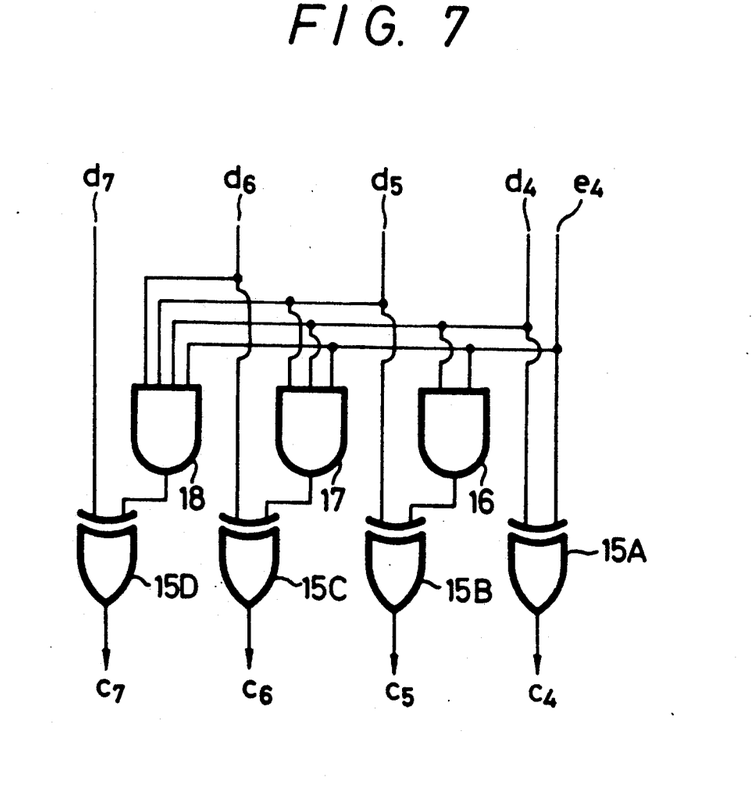
FIG. 7 is a schematic block diagram showing another example of the main portion of the adding circuit shown in FIG. 5.

FIG. 7 shows another example of the A4 block 12B, in which reference numerals 15A to 15D designate exclusive-OR circuits, 16 a 2-input AND circuit, 17 a 3-input AND circuit and 18 a 4-input AND circuit, respectively. As shown in FIG. 7, the intermediate added result $d_4$ and carry data $e_4$ are supplied to different input terminals of the exclusive-OR circuit 15A, different input terminals of the AND circuit 16, different input terminals of the AND circuit 17 and to different input terminals of the AND circuit 18. Output data of the AND circuit 16 is supplied to one input terminal of the exclusive-OR circuit 15B, while the intermediate added result $d_5$ is supplied to the other input terminal of the exclusive-OR circuit 15B, a third input terminal of the AND circuit 17 and to a third input terminal of the AND circuit 18. Further, output data from the AND circuit 17 is supplied to one input terminal of the exclusive-OR circuit 15C, and the intermediate added result $d_5$ is supplied to the other input terminal of the exclusive-OR circuit 15C and to a fourth input terminal of the AND circuit 18. Output data from the AND circuit 18 and the intermediate added result $d_7$ are supplied to different input terminals of the exclusive-OR circuit 15D, respectively. Output data from these exclusive-OR circuits 15A to 15D are obtained as final added results ($c_7$ to $c_4$).

The addition in which binary numbers ($d_7 \ldots d_4$) of 4 bits can be added with the carry data $e_4$ of one bit in the example of FIG. 7 will be described in detail.

Only when ($d_4$, $e_4$) = (1, 0) or ($d_4$, $e_4$) = (0, 1), the value $c_4$ becomes "1" so that the output data of the exclusive-OR circuit 15A becomes the value $C_4$, accurately. Further, assuming that $f_1$ represents carry data from 0'th bit to 1st bit then $f_1$ becomes "1" only when ($d_4$, $e_4$) = (1, 1), while the value $c_5$ becomes "1" only when ($d_5$, $f_1$) = (1, 0) or ($d_5$, $f_1$) = (0, 1). Thus, the output data from the exclusive-OR circuit 15B takes the value $c_5$, accurately. Similarly, assuming that $f_2$ represents carry data to the 2nd bit and that $f_3$ represents carry data to the 3rd bit, then $f_2$ becomes "1" only when ($d_5$, $d_4$, $e_4$) = (1, 1, 1) and $f_3$ becomes "1" only when ($d_6$, $d_5$, $d_4$, $e_4$) = (1, 1, 1, 1). Therefore, the output data from the exclusive-OR circuits 15C and 15D, respectively take values $c_6$ and $c_7$, accurately.

The example of FIG. 7 shows the circuit which performs the addition in a so-called table fashion. According to this circuit arrangement, the total calculation time can be reduced to about a calculation time of one full adder.

While in the above-mentioned example, the carry data to the 8th, 12th and 16th are not calculated in the respective A4 blocks 12B, 12C and 12D, these carry data are calculated by the carry computers (or calculator) 13B, 13C and 13D, respectively. A calculation in which accurate carry data $E_8$ to the 8th bit is obtained by the carry computer 13B will be described first.

The carry data $E_8$ becomes "1" only when carry data $e_8$ of 4-bit adder 9B is "1" or when carry data $e_4$ of the less significant 4-bit adder 9A and the added result ($d_7 \ldots d_4$) of the adder 9B suffice ($d_7$, $d_6$, $d_5$, $d_4$, $e_4$) = (1, 1, 1, 1, 1). Accordingly, the carry computer 13B, formed by the combination of the 5-input AND circuit 10B and the OR circuit 11B, can derive accurate carry data $E_8$ to the 8th bit.

Further, the accurate carry data $E_{12}$ to the 12th bit becomes "1" only when carry data $e_{12}$ of the adder 9C is "1" or when carry data $E_8$ to 8th bit and added result ($d_{11} \ldots d_8$) of the adder 9C suffice ($d_{11}$, $d_{18}$, $d_9$, $E_8$) = (1, 1, 1, 1, 1). Therefore, accurate carry data $E_{12}$ to 12th bit can be obtained by the carry computer 13C which is formed by the combination of the 5-input AND circuit 10C and the OR circuit 11C. Similarly, accurate carry data $E_{16}$ to 16th bit can be obtained by the carry computer 13D which is formed by the combination of the 5-input AND circuit 10D and the OR circuit 11D.

Figure 8:
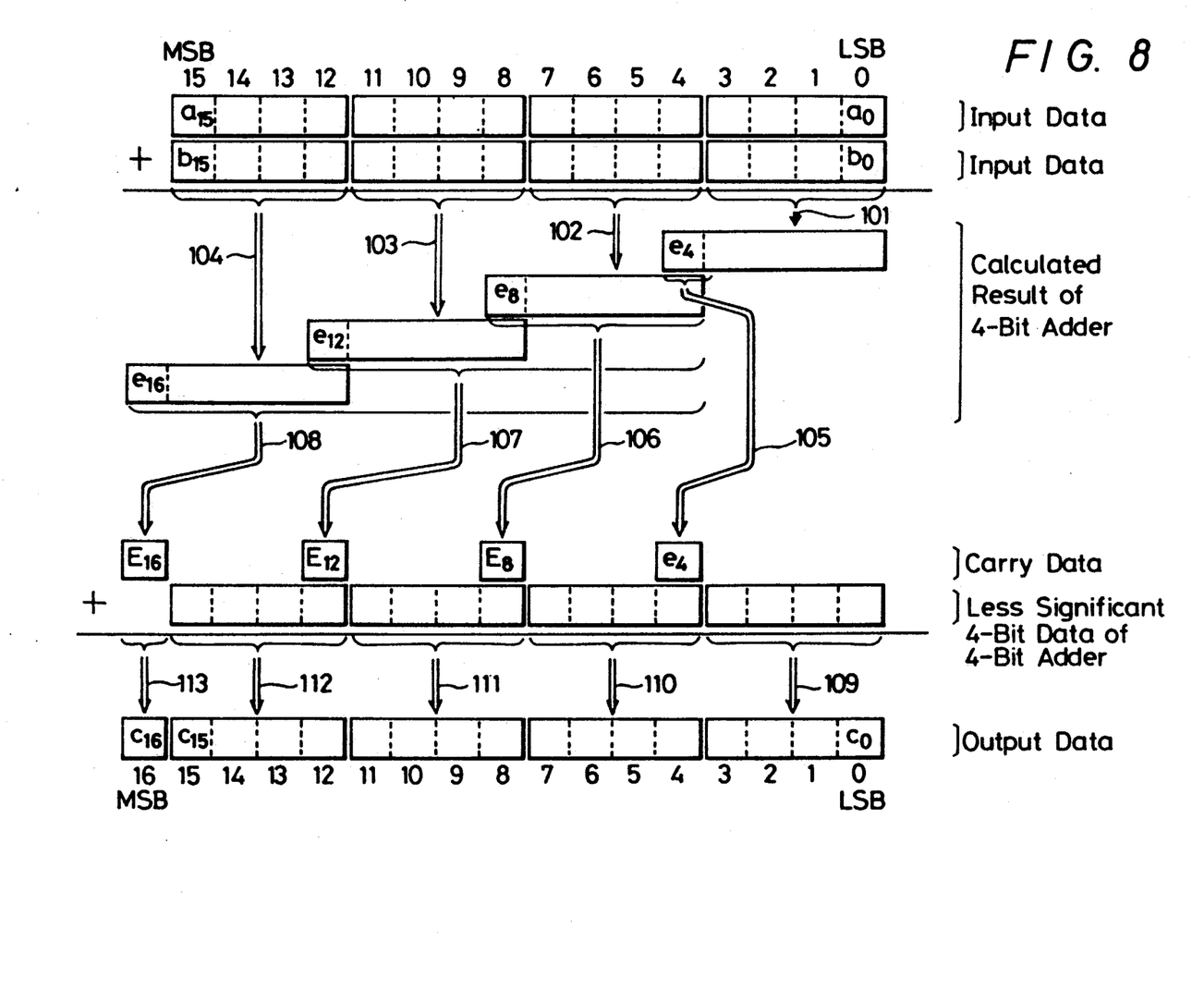
FIG. 8 is a schematic diagram used to explain an operation of the adding circuit of FIG. 5.

An operation in which two binary numbers can be added in the example of FIG. 5 will be summarized with reference to FIG. 8. Initially, two binary numbers are divided into 4 sections of 4 bits and additions are performed for these 4 sections of 4 bits in steps 101 to 104. Then, carry data $e_4$ obtained in step 101 directly becomes accurate carry data to 4th bit (at step 105), and accurate carry data $E_8$ to 8th bit is calculated (in step 106) from the carry data $e_4$ and added result of 4 bits obtained in step 102. Accurate carry data $E_{12}$ to 12th bit is calculated (in step 107) from the carry data $E_8$ and added result of 4 bits obtained in step 103, and accurate carry data $E_{16}$ to 16th bit is obtained (in step 108) from the carry data $E_{12}$ and added result of 4 bits obtained at step 104.

Finally, the least significant 4 bits of the added result in step 101 directly become the least significant 4 bits ($c_3 \ldots c_0$) of added result finally obtained (in step 109). Then, data of 4 bits ($c_7 \ldots c_4$) is obtained (in step 110) by adding the carry data $e_4$ to the 4 bits of the added result at step 102. Data of 4 bits ($c_{11} \ldots c_8$) are obtained (in step 111) by adding the carry data $E_8$ to less significant 4 bits of the added result in step 103, and data of 4 bits ($c_{15} \ldots c_{12}$) are obtained (in step 112) by adding the carry data $E_{12}$ to 4 bits of the added result in step 104. The carry data $E_{16}$ becomes data $c_{16}$ which is finally provided as the most significant bit (MSB) (in step 113).

Let us now evaluate a total calculation time $T_x$ of the example shown in FIG. 5, in which two input data assume binary numbers of n bits and the addition is performed under the condition that these input data are divided by m bits each. That is, $n = km$ (k is an integer) is established and the adders 9A to 9D are replaced with k m-bit adders. In that case, the calculation times of the carry computers 13B, 13C and the like are approximately the same as the calculation time t of one 1-bit full adder so that, when a circuit similar to that of the example of FIG. 7 is employed as the A4 blocks 12B, 12C or the like, the calculation times of the A4 blocks 12B, 12C or the like become substantially t. Thus, the total calculation time $T_x$ is expressed as:

$$T_x \approx \{m + (k-2) + 1\}t = (m + k - 1)t \quad (4)$$

Thus, the total calculation time $T_x$ in this example can be considerably reduced as compared with the total calculation time $T_1$ (equation (1)) of the prior-art example shown in FIG. 1. However, this calculation time $T_x$ is slightly longer as compared with the total calculation time $T_2$ (equation (2A) or (2B)) of the carry select adder system of the prior-art example shown in FIG. 2.

When the circuit in the example of FIG. 6 is employed as the A4 blocks 12B, 12C or the like, the total calculation time $T_x$ is provided as a value which results from adding m t to the equation (4).

The circuit scale of a example of FIG. 5 is made smaller than that of the carry select adder system because the circuit shown in FIG. 5 does not employ the multiplexer. Further, while the carry computers 13B, 13C and so on are supplied with only data of (m+1) bits, the carry look ahead circuits 3A, 3B and the like in the example of FIG. 2 are supplied with data of (2m+1) bits, the circuit scale of the carry computers 13B, 13C and the like can be reduced to substantially ½ as compared with that of the carry look ahead circuits 3A, 3B and the like. From this standpoint, there is then the advantage that the overall circuit scale can be made small.

A second embodiment of the present invention will be described with reference to FIG. 9. In this embodiment, the present invention is applied to an adding circuit which produces a binary number of 10 bits ($c_9, c_8 \ldots c_0$) by adding two binary numbers of 9 bits ($a_8 \ldots a_0$) and ($b_8 \ldots b_0$).

In this embodiment, input data of 9 bits are divided to provide 4 bits, 2 bits and 3 bits from the least significant bit (LSB).

Figure 9:
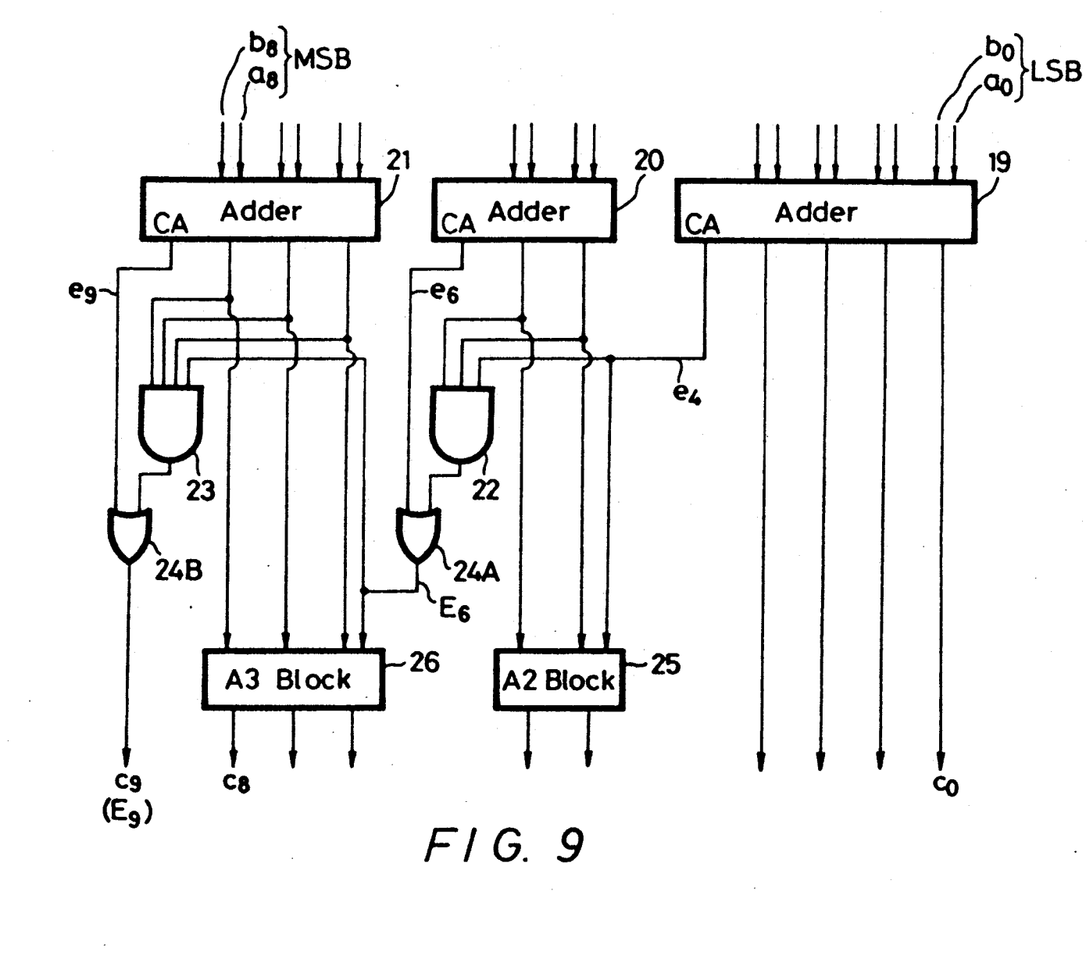
FIG. 9 is a schematic block diagram showing a second embodiment of the adding circuit according to the present invention.

In FIG. 9, reference numeral 19 designates a 4-bit adder, 20 a 2-bit adder and 21 a 3-bit adder, respectively. These adders 19, 20 and 21 perform the additions of binary numbers which are divided into 4 bits, 2 bits and 3 bits, respectively. Carry data $e_4$ of the adder 19 and an added result of less significant 2 bits of the adder 20 are supplied to different input terminals of a 3-input AND circuit 22, respectively, and output data of this 3-input AND circuit 22 and carry data $e_6$ of the adder 20 are supplied to an OR circuit 24A, from which there is derived accurate carry data $E_6$ to the 6th bit. Then, accurate carry data $E_9$ to the 9th bit is calculated from the carry data $E_6$, an added result of less significant 3 bits of the adder 21 and carry data $e_9$ of the adder 21.

Further, in FIG. 9, reference numeral 25 designates an adder (A2 block) which adds data $e_4$ of 1 bit to the binary numbers of 2 bits and reference numeral 26 designates an adder (A3 block) which adds data $E_6$ of 1 bit to the binary numbers of 3 bits. An added result of less significant 4 bits of the adder 19, an added result of 2 bits of the A2 block 25 and an added result of 3 bits of the A3 block become final added results ($c_8 \ldots c_0$) and the carry data $E_9$ directly becomes a value $c_9$ of final 9th bit. The operation and effects of the example of FIG. 9 are the same as those of the example of FIG. 5 and therefore need not be described.

A first embodiment of an accumulator which utilizes the adding circuit of the present invention will be described with reference to FIGS. 10 and 11. In this embodiment, the present invention is applied to an accumulator circuit which produces a sum s ($s_8 \ldots s_1, s_0$) of 9 bits by accumulating numbers x ($x_8 \ldots x_1, x_0$) of less than 9 bits which are sequentially supplied thereto.

Figure 10:
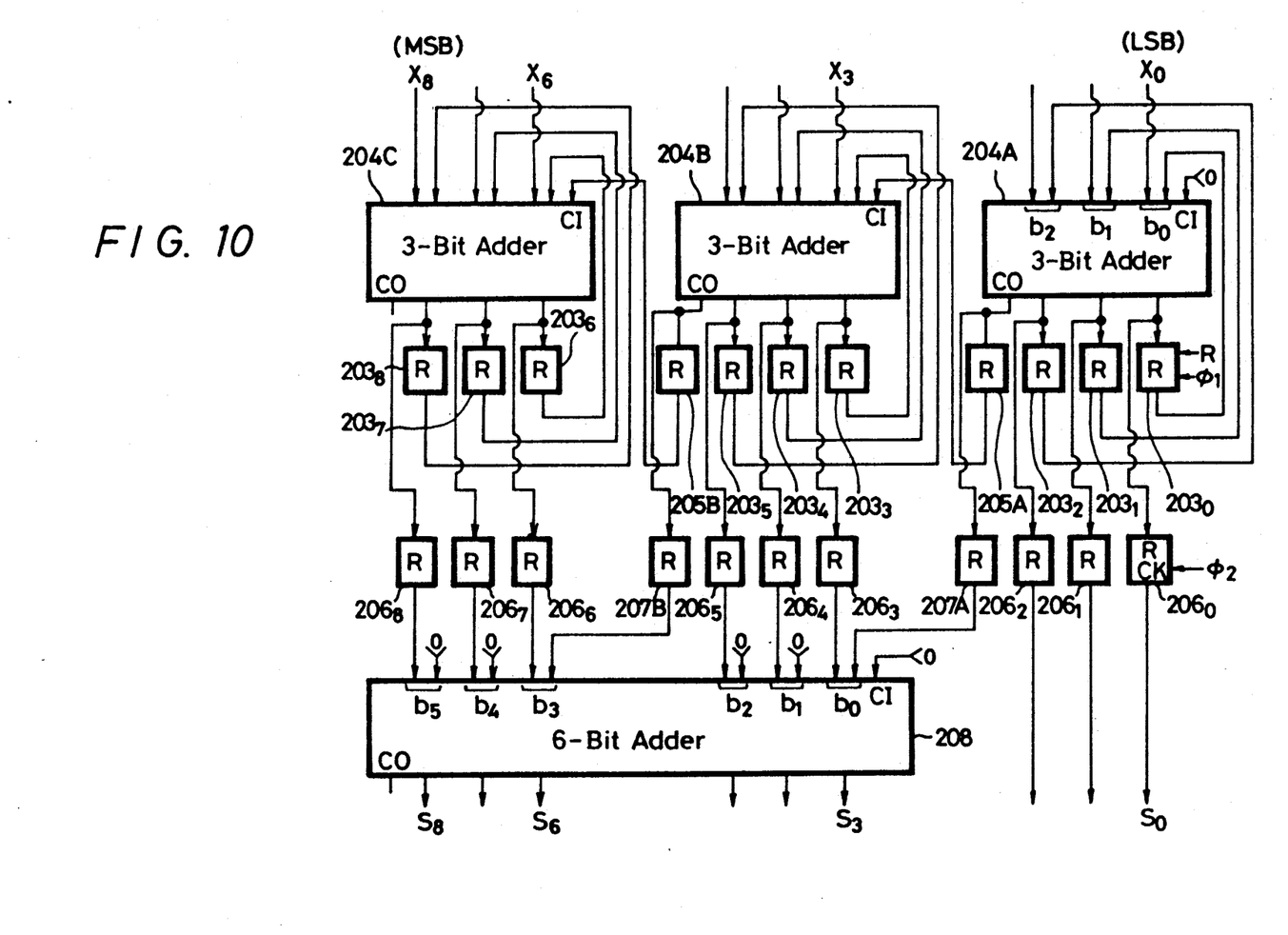
FIG. 10 is a schematic block diagram showing an embodiment of the accumulator according to the present invention.

FIG. 10 shows an accumulator of this embodiment. Referring to FIG. 10, three 3-bit adders 204A to 204C are formed of three 1-bit full adders, delay registers $203_0$ to $203_8$ and 205A to 205B are provided, each of which has clear and clock terminals, and data holding registers $206_0$ to $206_8$ and 207A and 207B are provided, each of which has a clock terminal (each of these registers is represented by reference letter R in FIG. 10 for simplicity). Further, there is shown a 6-bit adder 208 which comprises of six 1-bit full adders.

In this embodiment, 0 is supplied to carry input terminal CI of the 3-bit adder 204A, and data $x_0$ (LSB) to $x_2$ of the least significant 3 bits of the number x to be added are respectively supplied to first input terminals of the first bit input terminal $b_0$ to the third bit input terminal $b_2$ of the 3-bit adder 204A. Sum output of 3 bits therefrom are respectively supplied through the delay registers $203_0$ to $203_2$ to the other input terminals of the first bit input terminal $b_0$ to the third bit input terminal $b_2$ of the 3-bit adder 204A. A carry output to 4th bit produced at the carry output terminal CO of the delay register 204A is supplied through the delay register 205A to the carry input terminal CI of the 3-bit adder 204B.

Data $x_3$ to $x_5$ of 3 bits of the number x to be added are respectively supplied to first input terminals of the first bit input terminal to the third input terminal of the 3-bit adder 204B, and sum outputs of 3 bits therefrom are respectively supplied through the delay registers $203_3$ to $203_5$ to the other input terminals of the first bit input terminal to the third bit input terminal. A carry output to 4th bit (7th bit as the numbers x) is supplied through the delay register 205B to the carry input terminal CI of the 3-bit adder 204C. Simultaneously, data of the most significant 3 bits $x_6$ to $x_8$ of the numbers x to be added are respectively supplied to first input terminals of the first to the third input terminals of the 3-bit adder 204C and sum outputs of 3 bits therefrom are respectively supplied through the delay registers $203_6$ to $203_8$ to the other input terminals of the first to third input terminals of the 3-bit adder 204C, while its carry output terminal CO is opened.

Sum outputs of 3 bits from the 3-bit adder 204A are accumulated by the data holding registers $206_0$ to $206_2$ and provided as the least significant 3 bits $s_0$ to $s_2$ of the sum s. A carry output of the 3-bit adder 204A is supplied through the data holding register 207A to one input terminal of the first bit $b_0$ input terminal of the 6-bit adder 208 and 0 is supplied to the carry input terminal CI and first input terminals of the second bit $b_1$ and third bit $b_2$ input terminals of the 6-bit adder 208. The sum outputs of 3 bits from the 3-bit adder 204B are respectively supplied through the data holding registers $206_3$ to $206_5$ to the other input terminals of the first bit $b_0$ to third bit $b_2$ input terminals of the 6-bit adder 208. A carry output of the 3-bit adder 204B is supplied through the data holding register 207B to one input terminal of the fourth bit $b_3$ input terminal of the 6-bit adder 208, and 0 is supplied to first input terminals of the fifth bit $b_4$ and sixth bit $b_5$ input terminals of the 6-bit adder 208. Sum outputs of 3 bits from the 3-bit adder 204C are respectively supplied through the data holding registers $206_6$ to $206_8$ to the other input terminals of the fourth bit $b_3$ to sixth bit $b_6$ input terminals of the 6-bit adder 208, and a carry output terminal CO of the 6-bit adder 208 is opened. Sum outputs of 6 bits from the 6-bit adder 208 become the most significant 6-bits $S_3$ to $S_8$ of the sum s which is the accumulated result.

An operation of this accumulator will be described with reference to FIGS. 11A to 11E. In that case, the numbers x to be sequentially supplied are represented as n numbers (n is an integer larger than 2) of $x_1$ to $x_n$ and the bit arrangement of the number $x_1$ (i=1 to n) is expressed by ($x_{n\,8}$(MSB) to $x_{n\,1}$, $x_{n\,0}$(LSB.). Further, the numbers $x_1$ to $x_n$ are sequentially supplied at a predetermined cycle and a cycle of a clock pulse $\phi_1$ supplied to the delay registers $203_0$ to $203_8$, 205A and 205B is made coincident with the former predetermined cycle. Also, a clock pulse $\phi_2$ supplied to the data holding registers $206_0$ to $206_8$ and 207A and 207B occurs only when the sum s of the numbers $x_1$ to $x_n$ is finally generated in the expression of ordinary 9 bits.

In this embodiment, 0 is set as delay outputs of the delay registers $203_0$ to $203_8$, 205A and 205B by a reset pulse R for initialization and the numbers $x_1$ ($x_{18}$...$x_{10}$) added during the first cycle are supplied thereto. The resultant added results are the numbers $x_1$ (FIG. 11A), whereby the numbers $x_1$ are generated as the sum outputs of the 3-bit adders 204A to 204C and two carry outputs are both 0. When the clock $\phi_1$ is generated, the sum outputs and the carry outputs (i.e., accumulated results of the previous time) of the 3-bit adders 204A to 204C are respectively fed through the delay registers $203_0$ to $203_8$, 205A and 205B to the input sides of the 3-bit adders 204A to 204C and approximately simultaneously numbers $x_2$ ($x_{28}$...$x_{20}$) added during the second cycle are supplied to the input sides of the 3-bit adders 204A to 204C, whereby outputs ($s_{28}$...$s_{20}$), $c_{23}$ and $c_{26}$ are obtained as sum outputs of the 3-bit adders 204A to 204C, a carry output to the third bit and a carry output to the sixth bit.

The expression of the accumulated result of the sum outputs ($s_{28}$...$s_{20}$) and the carry outputs $c_{23}$ and $c_{26}$ is what might be called a redundancy expression. Since the above-mentioned redundancy expression is employed in this embodiment, when the numbers of 9 bits are added, it is not necessary to wait until the carry output propagates from the first bit to the ninth bit gradually. Then, the carry output $c_{23}$ to the fourth bit and carry output $c_{26}$ to the seventh bit are added altogether during the next third cycle. Accordingly, assuming that T represents the calculation time of the 1-bit full adder, then the calculation time required by the accumulator of this embodiment to add data of 9 bits is equal to calculation times 3T of the 3-bit adders 204A to 204C. Therefore, according to this embodiment, there is the substantial advantage that the calculation time can be reduced to ⅓ as compared with the example of FIG. 4. Further, as the circuits necessary for accumulation itself in this embodiment, only the registers 205A and 205B are additionally provided as compared with the example of FIG. 4. There is then the advantage that the circuit scale of this embodiment is made not so large.

Figure 11A:
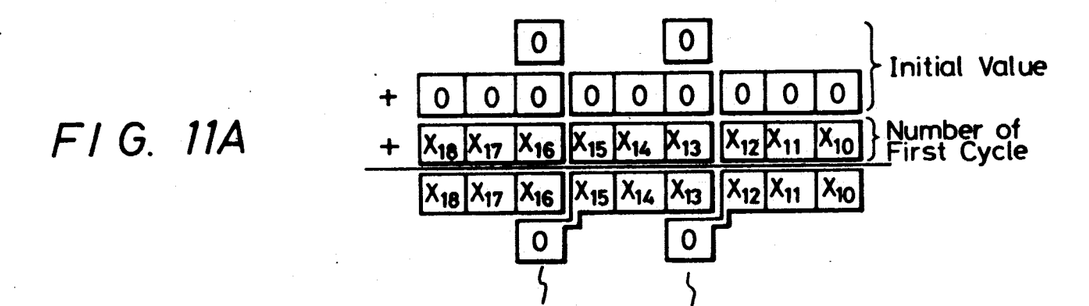
FIGS. 11A, 11B, 11C, 11D and 11E are schematic representations used to explain an operation of the embodiment shown in FIG. 10.
Figure 11B:
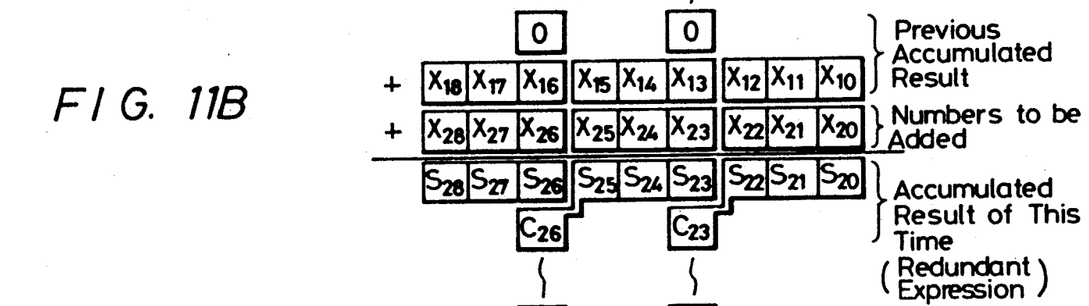
Figure 11C:
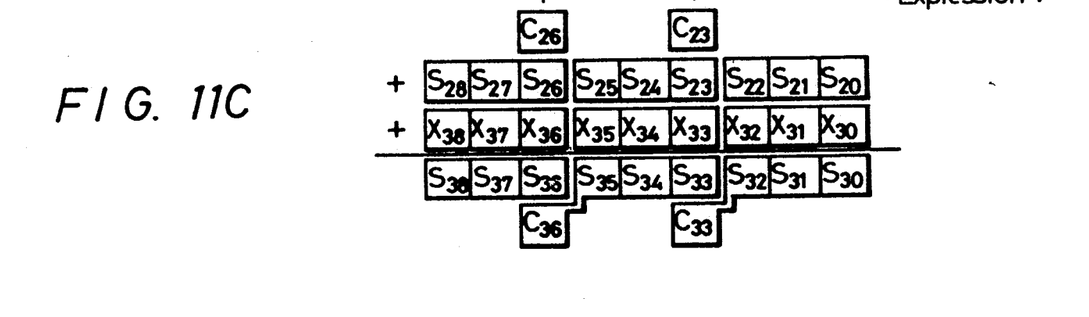
Figure 11D:
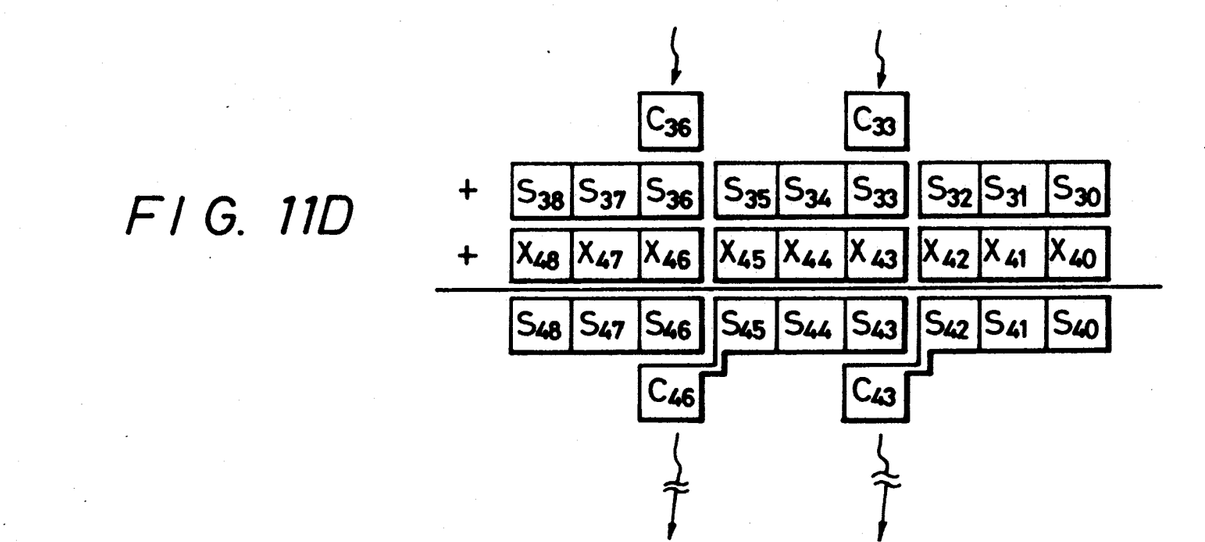

During the third cycle, in response to the clock pulse $\phi_1$ excited, the sum outputs ($s_{28}$...$s_{20}$) and the carry outputs $c_{23}$ and $c_{26}$ are fed through the delay registers $203_0$ to $203_8$ and 205A and 205B back to the input sides of the 3-bit adders 204A to 204C and simultaneously numbers $x_3$ ($x_{38}$...$x_{30}$) of the third cycle are supplied to the input sides of these 3-bit adders 204A to 204C, thereby generating sum outputs ($s_{38}$...$S_{30}$), a carry output $c_{33}$ to the fourth bit and a carry output $c_{36}$ to the seventh bit as shown in FIG. 11C. Similarly, during the fourth cycle, sum outputs ($s_{48}$...$s_{40}$) and carry outputs $c_{43}$ and $c_{46}$ are obtained as shown in FIG. 11D, and during an n'th cycle, outputs ($s_{n\,8}$...$s_{n\,0}$) and $c_{n\,3}$ and $c_{n\,6}$ are obtained as sum outputs of the 3-bit adders 104A to 204C, a carry output to the fourth bit and a carry output to the seventh bit, respectively.

Figure 11E:
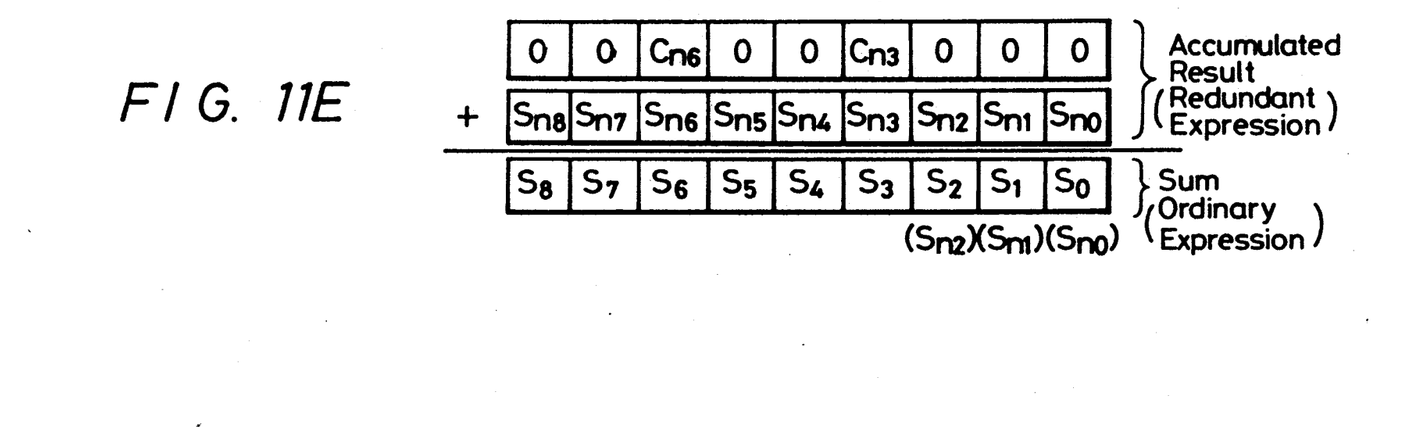

These sum outputs and carry outputs are redundant expressions of accumulated results of the numbers $x_1$ to $x_n$ of n number and can be employed in actual practice without modification. However, in order to facilitate the succeeding processing, according to this embodiment, such redundant expressions are converted into the expressions of ordinary 9 bits. More specifically, the clock pulse $\phi_2$ is generated at the completion of the addition of n cycles thereby to hold the sum outputs ($s_{n\,8}$...$s_{n\,0}$) and the carry outputs $c_{n\,3}$ and $c_{n\,6}$ in the data holding registers $206_0$ to $206_8$ and 207A and 207B. Then, the sum outputs and the carry outputs are added as shown in FIG. 11E, thereby obtaining the sum s ($s_8$...$s_1$, $s_0$) of 9 bits as the accumulated result of the ordinary expression. In that case, the addition of the least significant 3 bits is executed by outputting the least significant 3 bits ($s_{n\,2}$, $s_{n\,1}$, $s_{n\,0}$) of the sum outputs ($s_{n\,8}$...$s_{n\,0}$) directly, whereas the addition of the most significant 6 bits is executed by the 6-bit adder 208.

As described above, according to this embodiment, since the accumulated result of the redundant expression is returned to the ordinary expression, the succeeding processing can be made with ease.

Figure 12:
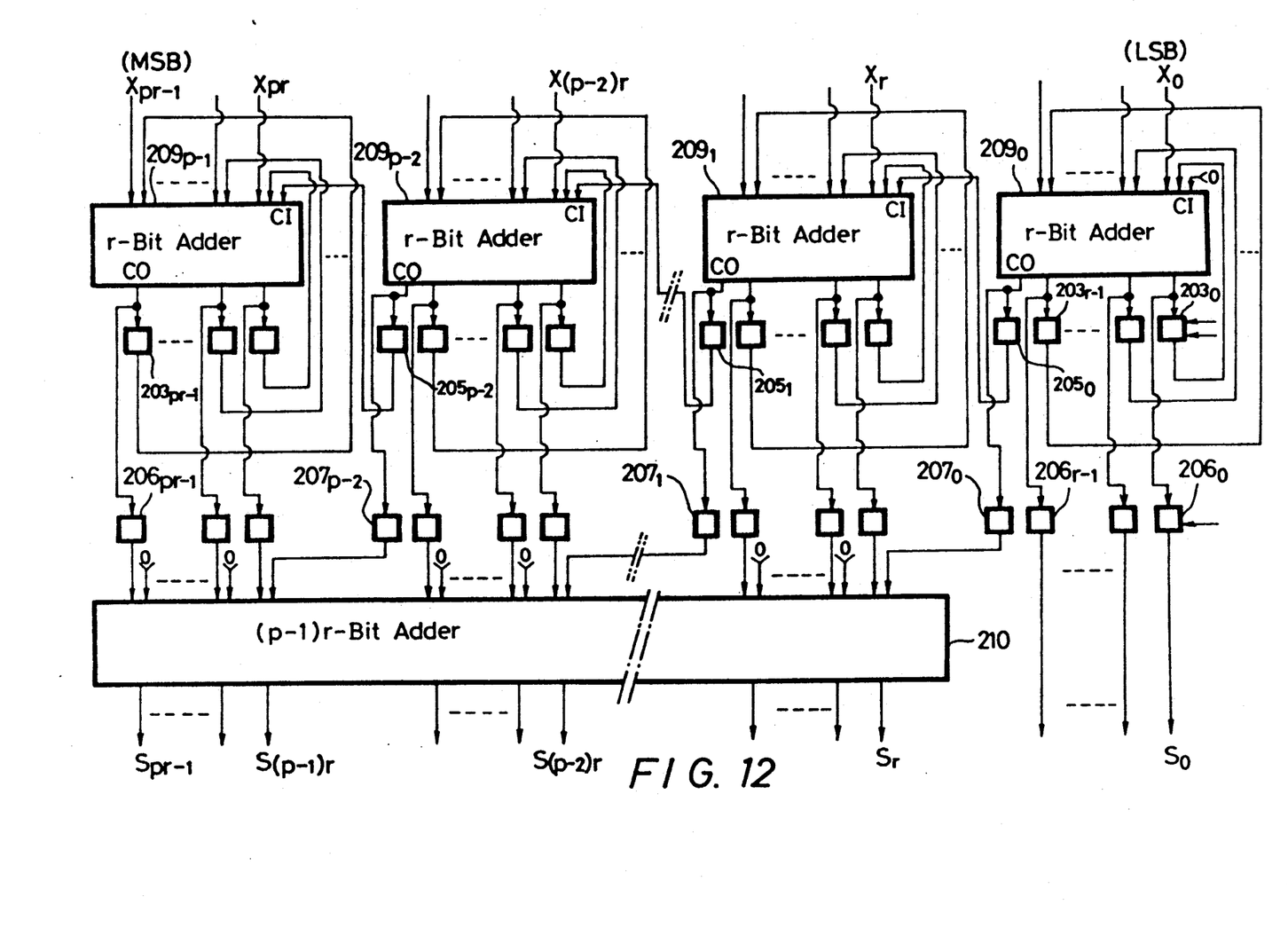
FIG. 12 is a schematic block diagram showing another embodiment of the accumulator which is provided by generalizing the accumulator of the present invention shown in FIG. 10.

The accumulator in the example of FIG. 10 is generalized as shown in FIG. 12, and this type of accumulator will be described with reference to FIG. 12.

In FIG. 12, reference numerals $209_0$ to $209_{p-1}$ designate r-bit adders (p and r are integers larger than 2), $203_0$ to $203_{p\,r-1}$, $205$ to $205_{p-2}$ designate delay registers, $206_0$ to $206_{p\,r-1}$ and $207$ to $207_{p-2}$ designate data holding registers and 210 designates a pr-bit adder. The aforenoted respective circuits are connected similarly to those of the example of FIG. 10.

According to the example shown in FIG. 12, sums s ($s_{p\,r-1} \ldots s_1, s_0$) of pr bits are obtained by accumulating numbers x ($x_{p\,r-1} \ldots x_1, x_0$) of less than pr bits. In that case, the sums s are expressed as redundant by the sum outputs of the r-bit adders $209_0$ to $209_{p-1}$ and the carry outputs. In the example of FIG. 12, the addition of the pr bits is executed at r bits each. If the accumulated result, for example, is obtained in the form of sums of (pr±1) bits, any one of these r-bit adders $209_0$ to $209_{p-1}$ may be replaced with an adder of (r±1) bits.

Further, since a calculation time required by the accumulator of the example of FIG. 12 to add the pr bits one time is substantially equal to individual calculation times rT of the r-bit adders $209_0$ to $209_{p-1}$, there is then the advantage that calculation times necessary for various purposes can be obtained by adjusting the value of r.

Furthermore, although the addition of a (p−1) r-bit adder 210 needs a calculation time of (p−1) rT, it is to be appreciated that the total calculation time is hardly affected by the calculation time in the (p−1) r-bit adder 210 because only one addition in the (p−1) r-bit adder 210 is performed after n (n≫1) accumulations are executed.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

We claim as our invention:

1. A digital adder circuit for adding binary numbers, said circuit comprising:

at least three adders for adding binary numbers each composed of a plurality of bits ordered from a least significant bit to a most significant bit, said plurality of bits being divided into at least three groups and said adders being respectively responsive to said groups and respectively producing interim added results ordered from least significant interim added results to next-to-least significant interim added results to most significant interim added results;

a first carry calculator responsive to carry data from the least significant interim added results and to the next-to-least significant interim added results for calculating carry data, a second carry calculator responsive to the carry data of the first carry calculator and to the most significant interim added results for producing carry data;

a first carry corrector for adding said carry data from the least significant interim added results to the next-to-least significant interim added results; and a second carry corrector for adding said carry data from the first carry calculator to the most significant interim added results, whereby a sum is generated having no redundancy.

2. The digital adder circuit according to claim 1 wherein at least one of said carry correctors comprises at least one AND circuit and at least one exclusive-OR circuit connected thereto.

3. An accumulator for accumulating a plurality of binary numbers sequentially supplied thereto, said accumulator comprising:

at least three adders of a plurality of bits each, each of said adders producing outputs and carry outputs;

a plurality of registers connected to said adders for delaying said outputs and said carry outputs by a determined time, said adders sequentially adding binary numbers sequentially supplied thereto and delayed outputs of said delay registers to produce redundant accumulated results;

first and second pluralities of data holding registers connected to said adders, and an additional adder connected to said second plurality of data holding registers and supplied with said redundant accumulated results for correcting each of said outputs by said carry outputs, said additional adder and said first plurality of data holding registers generating an accumulated added result having no redundancy.

* * * * *